(12) United States Patent
Yasunaga et al.

(10) Patent No.: US 10,960,623 B2
(45) Date of Patent: Mar. 30, 2021

(54) VENT PLUG, TIRE CURE MOLD, AND METHOD OF MANUFACTURING TIRE

(71) Applicant: TOYO TIRE CORPORATION, Itami (JP)

(72) Inventors: Toshikazu Yasunaga, Itami (JP); Tomohiro Deguchi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 106 days.

(21) Appl. No.: 16/519,413

(22) Filed: Jul. 23, 2019

(65) Prior Publication Data

US 2020/0130303 A1 Apr. 30, 2020

(30) Foreign Application Priority Data

Oct. 26, 2018 (JP) .............................. JP2018-201972

(51) Int. Cl.
*B29D 30/06* (2006.01)
*B29C 33/10* (2006.01)

(52) U.S. Cl.
CPC .......... *B29D 30/0606* (2013.01); *B29C 33/10* (2013.01); *B29D 2030/0617* (2013.01)

(58) Field of Classification Search
CPC ........ B29D 30/0606; B29D 2030/0617; B29C 33/10
See application file for complete search history.

(56) References Cited

U.S. PATENT DOCUMENTS

| 3,854,852 | A | * | 12/1974 | Carter | ..................... B29C 33/10 425/40 |
| 4,492,554 | A | * | 1/1985 | Carter | ..................... B29C 33/10 425/28.1 |
| 8,342,830 | B2 | * | 1/2013 | Sugata | ............... B29D 30/0606 425/28.1 |

FOREIGN PATENT DOCUMENTS

JP 2017-013312 A 1/2017
JP 2017-159514 A 9/2017

* cited by examiner

*Primary Examiner* — James P Mackey
(74) *Attorney, Agent, or Firm* — Westerman, Hattori, Daniels & Adrian, LLP

(57) ABSTRACT

A vent plug is mounted in a vent hole open in a molding face of a tire cure mold. The vent plug has a cylindrical housing having a vent path in itself, a stem that is inserted into the housing and serves as a valve element for opening and closing the vent path, and a coil-shaped spring that biases the stem toward a cavity so as to open the vent path. The vent path includes an outer inlet portion open in an annular shape between a valve seat provided to the housing and a head portion of the stem that comes in contact with the valve seat, and an inner inlet portion open in an annular shape on an inner side of the outer inlet portion.

10 Claims, 7 Drawing Sheets

[Fig. 1]
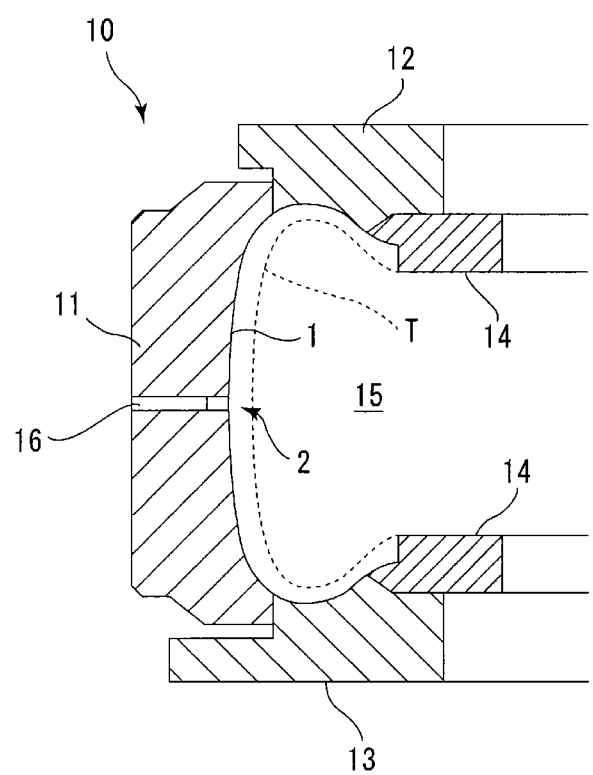

[Fig. 2]
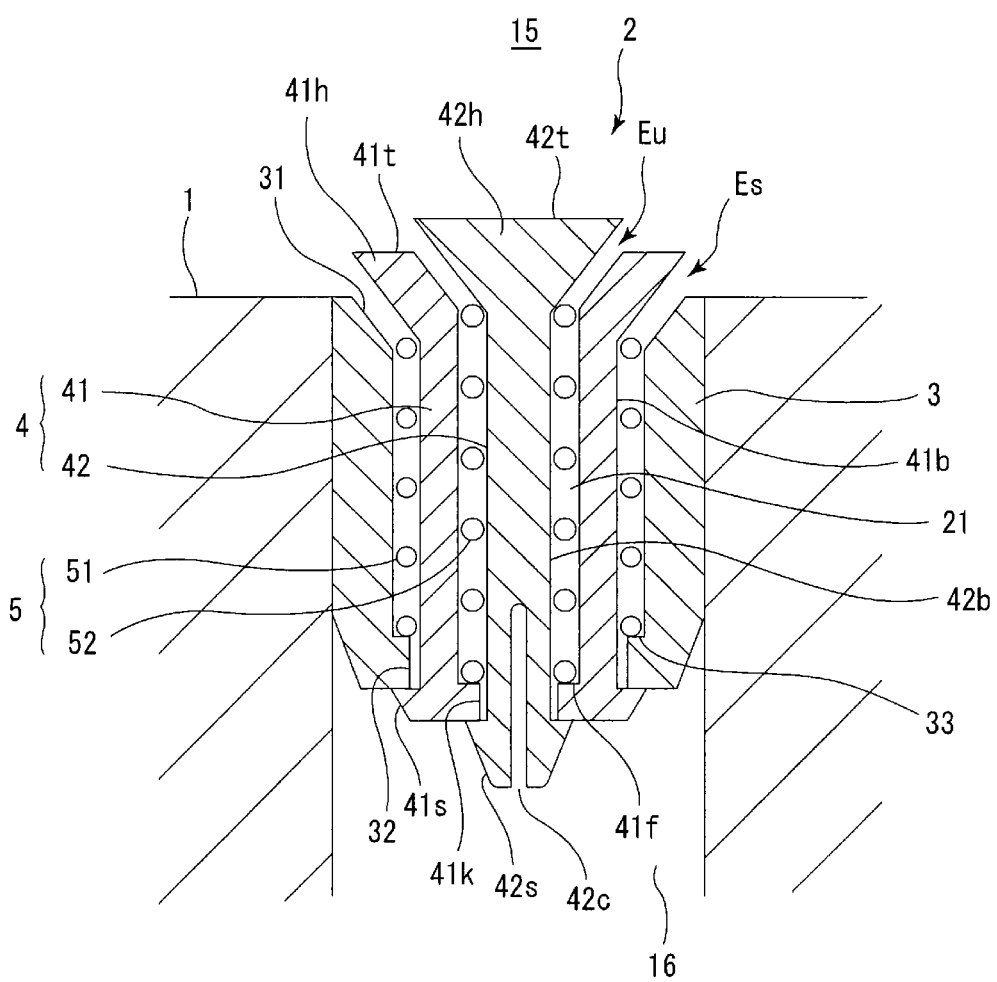

[Fig. 3]
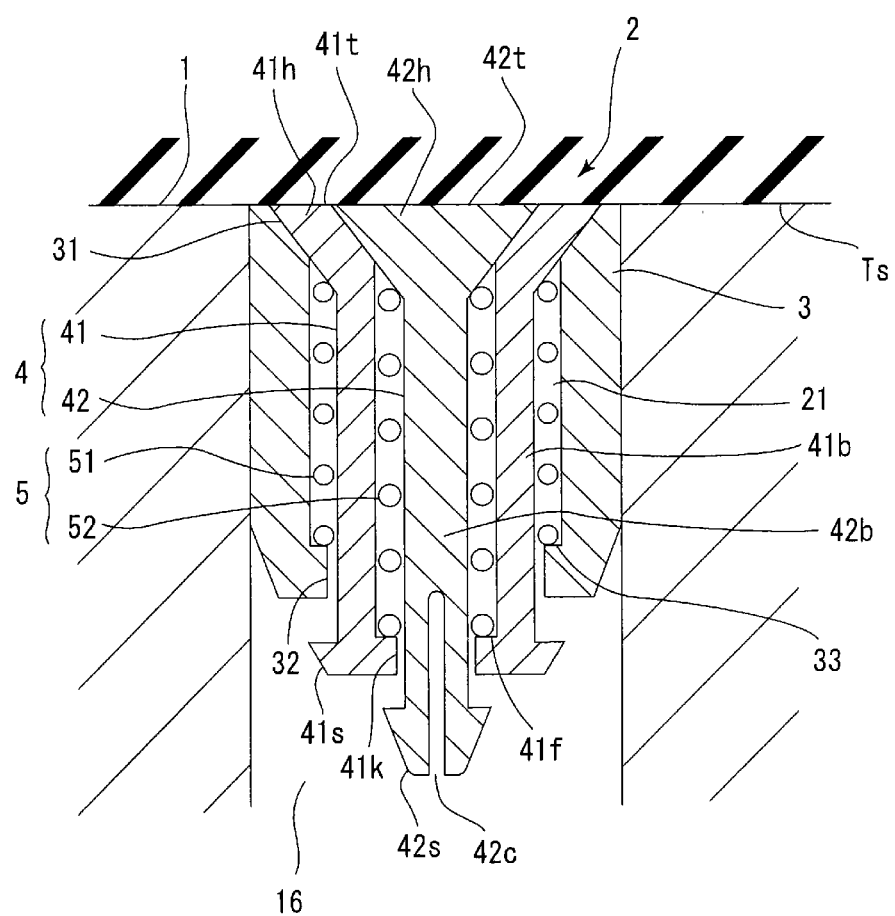

[Fig. 4]
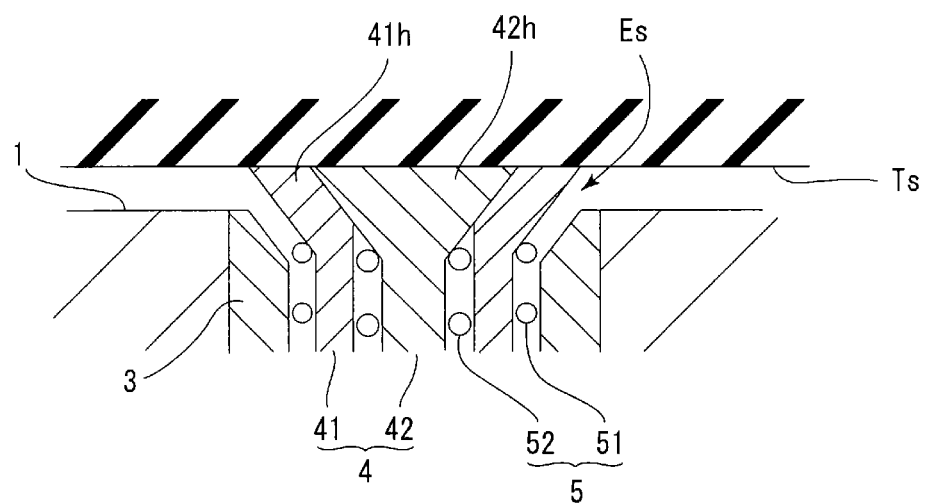
[Fig. 5]
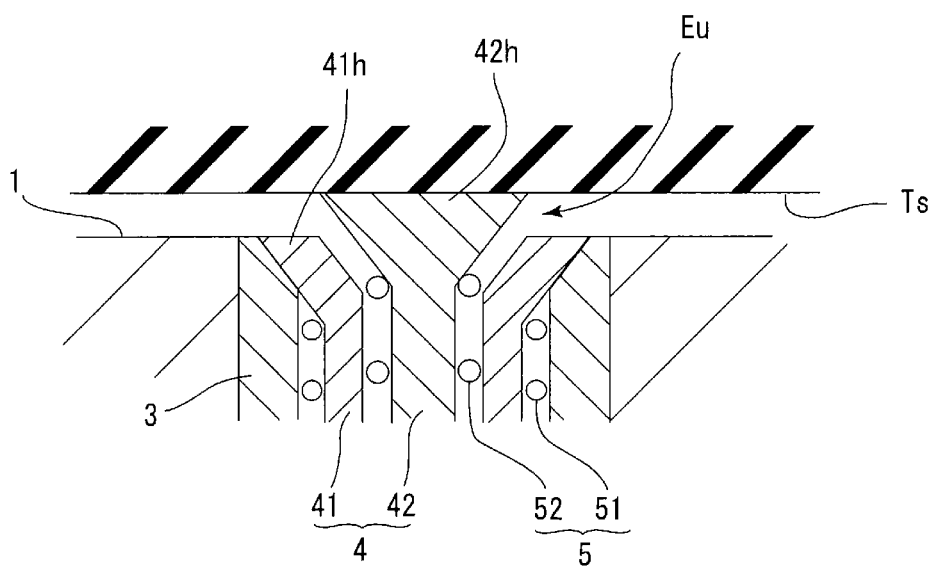

[Fig. 6]
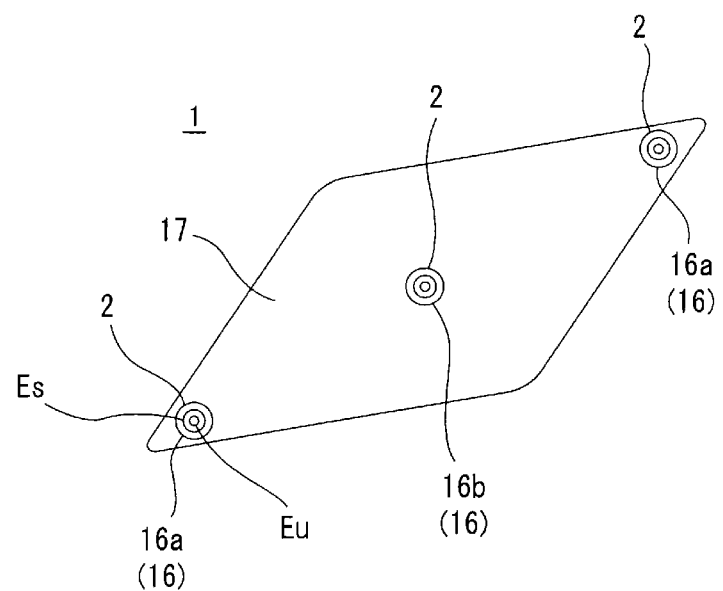

[Fig. 7]
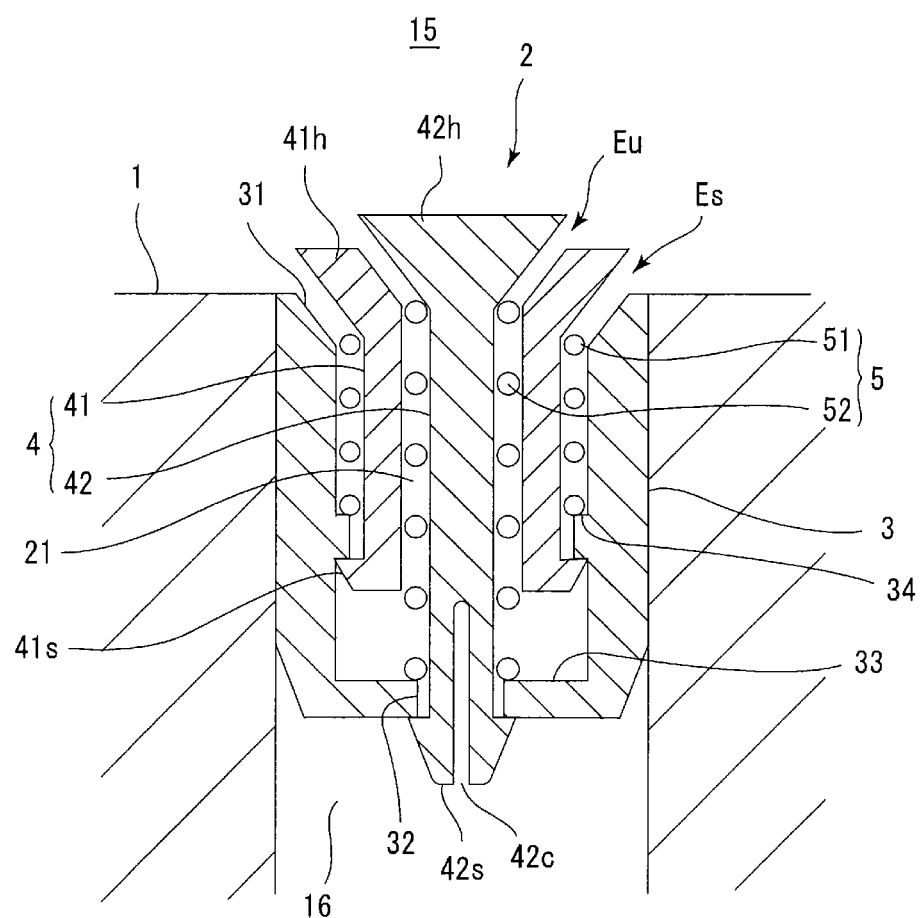

[Fig. 8]
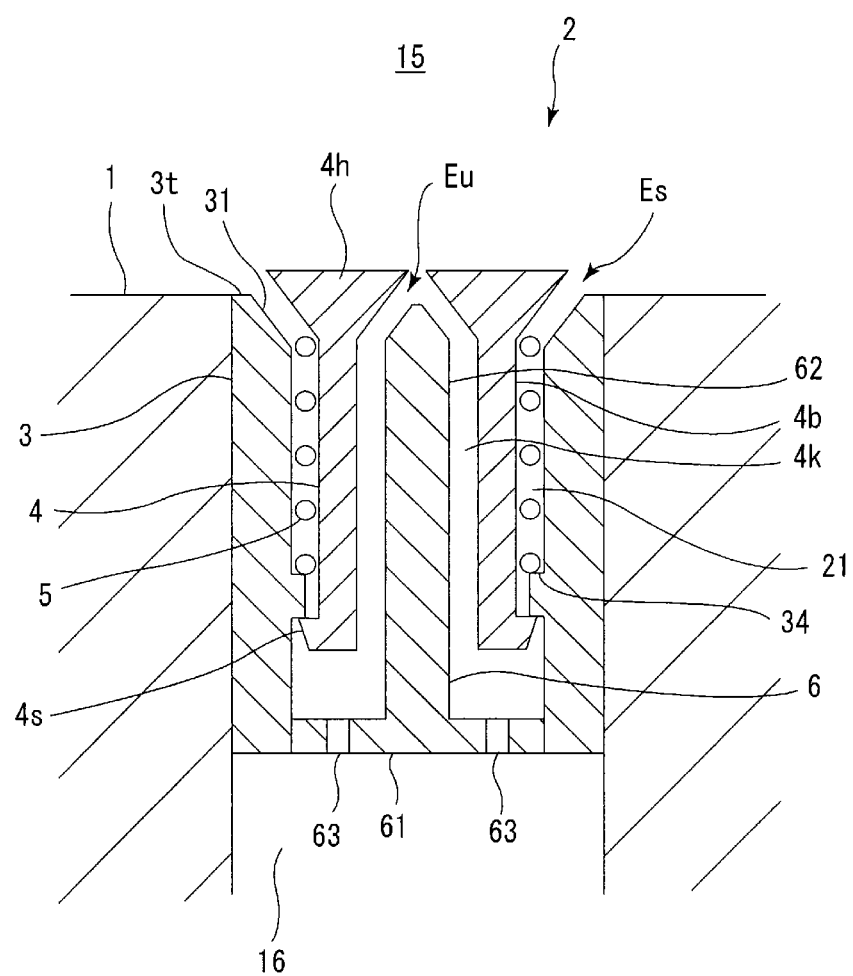

VENT PLUG, TIRE CURE MOLD, AND METHOD OF MANUFACTURING TIRE

BACKGROUND OF THE INVENTION

Field of the Invention

The present invention relates to a vent plug mounted in a vent hole in a molding face that comes in contact with an outer surface of a tire, a tire cure mold including the vent plug, and a method of manufacturing the tire by use of the tire cure mold.

Description of the Related Art

Conventionally, the tire cure mold has a large number of vent holes in a molding face for molding an outer surface of a tire. The vent holes lead to an inside and an outside of the mold and exhaust air between the outer surface of the tire and the molding face during cure to thereby prevent formation of a dent called "bear". During the cure, rubber on the outer surface of the tire flows into the vent holes and, as a result, forms a large number of rubber protrusions called "spews". On the other hand, there is a known method of preventing formation of spews by mounting vent plugs in vent holes.

A vent plug disclosed in Patent Document 1 includes a stem inserted into a cylindrical housing having a vent path in itself and is opened by biasing of the stem by a spring. The vent plug of this type has a tapered valve seat formed at the housing and an inlet of the vent path is closed and the vent plug comes into a closed state when a head portion of the stem pushed down by an outer surface of a tire is seated on the valve seat. The inlet of the vent path is open in an annular shape between the valve seat of the housing and the head portion of the stem and exhausting performance is enhanced as an opening area forming the inlet of the vent path increases.

Patent Document 1 describes the vent plug having exhausting performance enhanced by making a change rate of a spring compression amount nonlinear. However, this structure aims to increase a stroke of a valve (corresponding to the stem) to thereby prolong an open time and a size of the inlet of the vent path is considered to be the same as that of a prior-art vent plug.

Patent Document 2 describes a vent plug including a cylindrical housing having a nested double-layered structure and a valve (corresponding to the stem) inserted into the housing. However, this is a technique for facilitating attachment and detachment of the vent plug into and from a vent hole in a molding face and does not increase an opening area forming an inlet of a vent path, leaving a size of the inlet of the vent path unchanged from that of the prior-art vent plug.

PRIOR ART DOCUMENT

Patent Document

Patent Document 1: JP-A-2017-159514
Patent Document 2: JP-A-2017-13312

SUMMARY OF THE INVENTION

The present invention has been made with the above-described circumstances in view and an objective of the invention is to provide a vent plug with exhausting performance enhanced by increasing an opening area forming inlets of a vent path, a tire cure mold, and a method of manufacturing a tire.

The object can be achieved by the following present invention. A vent plug in accordance with the present invention is mounted in a vent hole open in a molding face of a tire cure mold. The vent plug has a cylindrical housing having a vent path in itself; a stem that is inserted into the housing and serves as a valve element for opening and closing the vent path; and a coil-shaped spring that biases the stem toward a cavity so as to open the vent path. The vent path includes an outer inlet portion open in an annular shape between a valve seat provided to the housing and a head portion of the stem that comes in contact with the valve seat, and an inner inlet portion open in an annular shape on an inner side of the outer inlet portion. With this structure, the vent path has not only the inlet (outer inlet portion) open in the annular shape between the valve seat of the housing and the head portion of the stem but also the inlet (inner inlet portion) open in the annular shape on the inner side of the outer inlet portion, which increases an opening area forming the inlets of the vent path to thereby enhance exhausting performance.

The stem may include a cylindrical outer stem member and an inner stem member inserted into the outer stem member. The outer stem member has a head portion that comes in contact with the valve seat to thereby close the outer inlet portion, and the inner stem member has a head portion that comes in contact with an inner side face of the head portion of the outer stem member to thereby close the inner inlet portion. In this case, the outer inlet portion is formed between the valve seat of the housing and the head portion of the outer stem member and the inner inlet portion is formed between the inner side face of the head portion of the outer stem member and the head portion of the inner stem member.

The spring may include an outer spring that biases the outer stem member toward the cavity so as to open the outer inlet portion, and an inner spring that biases the inner stem member toward the cavity so as to open the inner inlet portion. If the position of the farther end of the inner spring from the cavity is regulated by the outer stem member, it is possible to close the outer inlet portion later or earlier than the inner inlet portion by making a spring rate of the outer spring different from that of the inner spring.

A tire cure mold in accordance with the present invention has the molding face that comes in contact with an outer surface of a tire set in the cavity and the above-described vent plug mounted in the vent hole open in the molding face. With this structure, it is possible to increase the opening area forming the inlets of the vent path in the vent plug to thereby enhance the exhausting performance.

Another tire cure mold in accordance with the present invention has the molding face that comes in contact with an outer surface of a tire set in the cavity and the above-described vent plug mounted in the vent hole open in the molding face. The vent hole in which the vent plug is mounted is disposed at a position close to an outer edge of a recessed portion formed in the molding face to form a land and the outer spring has a higher spring rate than the inner spring. With this structure, by opening the outer inlet portion relatively close to the outer edge of the recessed portion, it is possible to efficiently exhaust air that is likely to stay along the outer edge.

A method of manufacturing a tire in accordance with the present invention has a step of performing cure by setting an uncured tire in the cavity of a tire cure mold including the above-described vent plug and heating and pressurizing the uncured tire. With this method, it is possible to increase the opening area forming the inlets of the vent path in the vent plug to thereby enhance the exhausting performance.

BRIEF DESCRIPTION OF THE DRAWINGS

FIG. 1 is a vertical sectional view schematically showing an example of a tire cure mold having a vent plug according to the present invention;

FIG. 2 is a sectional view showing a vent plug in an open state in a first embodiment;

FIG. 3 is a sectional view showing a vent plug in a closed state in a first embodiment;

FIG. 4 is a sectional view showing the vent plug in a transition from an open state to a closed state;

FIG. 5 is a sectional view showing the vent plug in a transition from an open state to a closed state;

FIG. 6 is a view showing an example of a recessed portion for forming a land;

FIG. 7 is a sectional view showing a vent plug in an open state in a second embodiment; and FIG. 8 is a sectional view showing a vent plug in an open state in a third embodiment.

DETAILED DESCRIPTION OF THE PREFERRED EMBODIMENT

An embodiment of the present invention will be explained with reference to the drawings.

First Embodiment

FIG. 1 shows a section of a tire cure mold 10 (hereinafter merely referred to as "mold 10" in some cases) along a tire meridian. The mold 10 is in a closed state. A tire T is set with a tire width direction oriented in a vertical direction. In FIG. 1, a left side corresponds to an outer side in a tire diametrical direction and a right side corresponds to an inner side in the tire diametrical direction. FIG. 2 is an enlarged view of a relevant part in FIG. 1, wherein an upper side corresponds to the inner side in the tire diametrical direction and a lower side corresponds to the outer side in the tire diametrical direction.

The mold 10 has a molding face 1 that comes in contact with an outer surface of the tire T set in a cavity 15. In the molding face 1, vent holes 16 communicating with an inside (the cavity 15) and an outside of the mold 10 are formed. In cure, air between the tire T and the molding face 1 is exhausted through the vent holes 16. As shown in the enlarged view in FIG. 2, a vent plug 2 is mounted in each of the vent holes 16 open in the molding face 1.

An aluminum material is exemplified as a raw material of the molding face 1. The aluminum material is a concept including an aluminum alloy in addition to a pure aluminum raw material, for example, there can be listed up Al—Cu, Al—Mg, Al—Mg—Si, Al—Zn—Mg, Al—Mn and Al—Si. A housing 3 and a stem 4 (described later) forming the vent plug 2 are preferably made of steel represented by stainless steel and S45C and the housing 3 and the stem 4 may be made of the same kind or different kinds of metal.

The mold 10 includes a tread mold portion 11 for molding a tread portion of the tire, side mold portions 12, 13 for molding sidewall portions of the tire, and bead rings 14, 14 in which bead portions of the tire are fitted. The molding face 1 includes an inner face of the tread mold portion 11 and inner faces of the side mold portions 12, 13. Protruding portions (not shown) for forming grooves in a tread face of the tire and recessed portions (see FIG. 6) for forming lands such as blocks are provided to the inner face of the tread mold portion 11. Although only one of the vent holes 16 open in the inner face of the tread mold portion 11 is shown in FIG. 1, there are actually the large number of vent holes open in the inner faces of the tread mold portion 11 and the side mold portions 12, 13.

As shown in FIG. 2, the vent plug 2 includes the cylindrical housing 3 having a vent path 21 in itself, the stem 4 that is inserted into the housing 3 and serves as a valve element for opening and closing the vent path 21, and a coil-shaped spring 5 that biases the stem 4 toward the cavity 15 so as to open the vent path 21.

The housing 3 is fixed to the molding face 1. More specifically, the housing 3 is press-fitted into the vent hole 16 by interference fitting. A tapered valve seat 31 is provided to the housing 3. The valve seat 31 is formed at a closer end of the housing 3 to the cavity 15. In a farther end of the housing 3 from the cavity 15, a through hole 32 and a support portion 33 having an inner flange shape are formed.

The vent path 21 includes an outer inlet portion Es open in an annular shape between the valve seat 31 provided to the housing 3 and a head portion of the stem 4 (a head portion 41h of an outer stem member 41 described later) that comes in contact with the valve seat 31, and an inner inlet portion Eu open in an annular shape on an inner side of the outer inlet portion Es. The outer inlet portion Es and the inner inlet portion Eu are respectively open in the annular shapes and have the same center. Therefore, the vent path 21 has the inlets open in shapes of concentric circles (i.e., the outer inlet portion Es and the inner inlet portion Eu). In the vent plug 2, the vent path 21 has not only the outer inlet portion Es along the valve seat 31 of the housing 3 but also the inner inlet portion Eu open on the inner side of the outer inlet portion Es, which increases an opening area forming the inlets of the vent path 21 to thereby enhance exhausting performance.

In the embodiment, the stem 4 includes the cylindrical outer stem member 41 and an inner stem member 42 inserted into the outer stem member 41. The stem 4 has a double-layered structure formed by inserting the inner stem member 42 into the outer stem member 41 in a nested manner. The outer inlet portion Es is open in the annular shape between the valve seat 31 of the housing 3 and the head portion 41h of the outer stem member 41. The inner inlet portion Eu is open in the annular shape between an inner side face of the head portion 41h of the outer stem member 41 and a head portion 42h of the inner stem member 42 that comes in contact with the inner side face of the head portion 41h. The inner side face of the head portion 41h is formed in a tapered shape and functions as a valve seat.

The outer stem member 41 includes a cylindrical trunk portion 41b and the cylindrical head portion 41h integrally connected to the trunk portion 41b. The trunk portion 41b is formed in a cylindrical shape extending in an axial direction. As shown in FIG. 3, the head portion 41h comes in contact with the valve seat 31 to thereby close the outer inlet portion Es. At a farther end of the outer stem member 41 from the cavity 15, a stopper 41s having a larger diameter than the through hole 32, a slit (not shown), a through hole 41k, and a support portion 41f having an inner flange shape are formed. Detachment of the outer stem member 41 from the housing 3 is prevented by the stopper 41s. The stopper 41s can pass through the through hole 32 when the stopper 41s is resiliently deformed in such a manner as to close the slit.

The inner stem member 42 includes a columnar trunk portion 42b and the head portion 42h integrally connected to the trunk portion 42b. The trunk portion 42b is formed in a circular columnar shape extending in the axial direction. As shown in FIG. 3, the head portion 42h comes in contact with the inner side face of the head portion 41h to thereby close the inner inlet portion Eu. At a farther end of the inner stem member 42 from the cavity 15, a stopper 42s having a larger diameter than the through hole 41k, and a slit 42c are formed. Detachment of the inner stem member 42 from the outer stem member 41 is prevented by the stopper 42s. The stopper 42s can pass through the through hole 41k when the stopper 42s is resiliently deformed in such a manner as to close the slit 42c.

In the embodiment, the spring 5 includes an outer spring 51 that biases the outer stem member 41 toward the cavity 15 so as to open the outer inlet portion Es and an inner spring 52 that biases the inner stem member 42 toward the cavity 15 so as to open the inner inlet portion Eu. The trunk portion 41b is inserted through the outer spring 51 and the outer spring 51 is disposed between the head portion 41h and the support portion 33. A position of a farther end of the outer spring 51 from the cavity 15 is regulated by the housing 3. The trunk portion 42b is inserted through the inner spring 52 and the inner spring 52 is disposed between the head portion 42h and the support portion 41f. A position of a farther end of the inner spring 52 from the cavity 15 is regulated by the outer stem member 41.

In FIG. 2, the vent path 21 is open and the vent plug 2 is in an open state. In an open state shown in FIG. 2, the head portion 41h of the outer stem member 41 pushed up by the outer spring 51 is separated from the valve seat 31. The head portion 42h of the inner stem member 42 pushed up by the inner spring 52 is separated from the inner side face of the head portion 41h of the outer stem member 41. In the open state of the vent plug 2, the air in the cavity 15 is exhausted to the outside of the mold 10 through the vent path 21 as the outer surface of the tire approaches the molding face 1. The vent path 21 is formed to extend from the outer inlet portion Es and the inner inlet portion Eu through spaces around the trunk portion 41b and the trunk portion 42b and the through hole 32 and the through hole 41k.

In FIG. 3, the vent path 21 is closed and the vent plug 2 is in a closed state. In a closed state, the head portion 41h pushed down by the outer surface Ts of the tire becomes seated on the valve seat 31 and the head portion 42h similarly comes in contact with (becomes seated on) the inner side face of the head portion 41h. An outer side face of the head portion 41h is formed in a tapered shape conforming to the valve seat 31. A side face of the head portion 42h is formed in a tapered shape conforming to the inner side face of the head portion 41h. Although a top face 41t of the outer stem member 41 facing the cavity 15 is flush with a top face 42t of the inner stem member 42 in the closed state in the embodiment, the invention is not limited to this structure. When the outer surface Ts of the tire separates from the molding face 1, the stem 4 is pushed up by the spring 5 and the vent plug 2 comes into the open state shown in FIG. 2.

FIG. 4 shows the inner inlet portion Eu that is closed earlier than the outer inlet portion Es during a transition from the open state to the closed state of the vent plug 2. However, the stem 4 and the spring 5 are formed as described above in the embodiment and therefore the outer inlet portion Es may be closed earlier than the inner inlet portion Eu as in a mode shown in FIG. 5 or the outer inlet portion Es and the inner inlet portion Eu may be closed simultaneously in another mode. To achieve desired one of the above-described modes, it is useful to make a spring rate of the outer spring 51 different from that of the inner spring 52.

For example, if the spring rate of the outer spring 51 is higher than that of the inner spring 52 by a suitable amount, the outer spring 51 is less likely to compress than the inner spring 52, which corresponds to the mode in FIG. 4 where a relatively long open time of the outer inlet portion Es can be secured. Such a vent plug 2 may be mounted in vent holes 16 disposed at a position close to outer edges of a recessed portion 17 for forming a land and shown as an example in FIG. 6, e.g., vent holes 16a disposed in corners of the recessed portion 17. By opening the outer inlet portions Es relatively close to the outer edges of the recessed portion 17, it is possible to efficiently exhaust air that is likely to stay along the outer edges.

On the other hand, if the spring rate of the inner spring 52 is higher than that of the outer spring 51 by a suitable amount, the inner spring 52 is less likely to compress than the outer spring 51, which corresponds to the mode in FIG. 5 where a relatively long open time of the inner inlet portion Eu can be secured. Such a vent plug 2 may be mounted in a vent hole 16 disposed at a position far from the outer edges of the recessed portion 17 for forming the land, e.g., a vent hole 16b disposed at a center of the recessed portion 17. By opening the inner inlet portion Eu positioned at the center of the recessed portion 17, it is possible to efficiently exhaust air that is likely to stay at the center.

The method of manufacturing the tire by using the mold 10 includes a step of performing cure by setting an uncured tire in the cavity 15 of the mold 10 and heating and pressurizing the uncured tire. The tire is expanded and deformed by inflation of a rubber bag called bladder and the outer surface of the tire comes to push the molding face 1. In this process, the air between the tire and the molding face 1 is exhausted outside through the vent path 21 in each of the vent plugs 2. At this time, it is possible to draw the air in a space in the vent hole 16 by using a suction device to thereby enhance exhausting performance. In the open state, not only the outer inlet portion Es but also the inner inlet portion Eu of the vent plug 2 are open, which increases the opening area forming the inlets of the vent path 21 to thereby enhance the exhausting performance.

In the embodiment, the vent plug 2 described above is mounted in the vent hole 16 open in an inner face of the tread mold portion 11 as the molding face 1. Alternatively or additionally, it is also possible to mount the vent plug 2 in each of the vent holes open in the inner face(s) of the side mold portion 12 (and/or the side mold portion 13).

Although a mold structure including the tread mold portion 11 and the paired side mold portions 12, 13 is shown as an example in the embodiment, the mold does not necessarily have to have this structure and a mold structure split into upper and lower two portions at a center of a tread mold portion may be employed, for example.

Second Embodiment

Since a second embodiment is similar to the first embodiment except the structures which are described below, a description will be mainly given of different points while omitting common points. The same members and portions as those described in the first embodiment will be provided with the same reference signs and will not be described repeatedly. This holds true for the third embodiment.

FIG. 7 shows a vent plug 2 in an open state in the second embodiment. Similarly to the first embodiment, a vent path 21 includes an outer inlet portion Es open in an annular shape between a valve seat 31 of a housing 3 and a head portion of a stem 4 (specifically, a head portion 41h of an outer stem member 41), and an inner inlet portion Eu open in an annular shape on an inner side of the outer inlet portion Es. In this way, it is possible to increase an opening area forming the inlets of the vent path 21 to thereby enhance exhausting performance.

In the second embodiment, the housing 3 has a support portion 34 having an inner flange shape on a side of a support portion 33 closer to a cavity 15. The outer stem member 41 has a stopper 41s having a larger diameter than an inside diameter of the support portion 34 and detachment of the outer stem member 41 from the housing 3 is prevented by the stopper 41s. An inner stem member 42 has a stopper 42s having a larger diameter than a through hole 32 and detachment of the inner stem member 42 from the housing 3 is prevented by the stopper 42s. An outer spring 51 is disposed between the head portion 41h and the support portion 34 and an inner spring 52 is disposed between a head portion 42h and the support portion 33. A position of a farther end of the inner spring 52 from the cavity 15 is regulated by the housing 3.

When the stem 4 is pushed down by an outer surface of the tire, the head portion 42h of the inner stem member 42 first comes in contact with (becomes seated on) an inner side face of the head portion 41h of the outer stem member 41 to close the inner inlet portion Eu and then the head portion 41h of the outer stem member 41 becomes seated on the valve seat 31 to close the outer inlet portion Es. Therefore, with this structure, irrespective of spring rates of the outer spring 51 and the inner spring 52, the inner inlet portion Eu is closed earlier than the outer inlet portion Es. Therefore, during a transition from an open state to a closed state of the vent plug 2, a relatively long open time of the outer inlet portion Es can be secured.

Third Embodiment

FIG. 8 shows a vent plug 2 in an open state in a third embodiment. Similarly to the first embodiment, a vent path 21 includes an outer inlet portion Es open in an annular shape between a valve seat 31 of a housing 3 and a head portion of a stem 4, and an inner inlet portion Eu open in an annular shape on an inner side of the outer inlet portion Es. In this way, it is possible to increase an opening area forming the inlets of the vent path 21 to thereby enhance exhausting performance.

In the third embodiment, the vent plug 2 includes a central shaft member 6 mounted to the housing 3. The central shaft member 6 has a disc-shaped base portion 61 fitted in a farther end of the housing 3 from a cavity 15, and a shaft portion 62 extending from a central portion of the base portion 61 toward the cavity 15. An air vent 63 is formed in the base portion 61. A tip end of the shaft portion 62 is disposed at the same height as a top face 3t of the housing 3. The stem 4 includes a trunk portion 4b, a head portion 4h integrally connected to the trunk portion 4b, and a through hole 4k extending in an axial direction, and is formed in a cylindrical shape as a whole. The shaft portion 62 is inserted into the through hole 4k of the stem 4 and a side face of the tip end portion of the shaft portion 62 is formed in a tapered shape.

The housing 3 has a support portion 34 having an inner flange shape on a side of the base portion 61 closer to the cavity 15. The stem 4 has a stopper 4s having a larger diameter than an inside diameter of the support portion 34 and detachment of the stem 4 from the housing 3 is prevented by the stopper 4s. A spring 5 is disposed between the head portion 4h of the stem 4 and the support portion 34. A position of a farther end of the spring 5 from the cavity 15 is regulated by the housing 3. Although the central shaft member 6 is a separate member from the housing 3, the central shaft member 6 does not necessarily have to be the separate member from the housing 3 and may be formed integrally with the housing 3.

The outer inlet portion Es is open in an annular shape between the valve seat 31 of the housing 3 and the head portion 4h of the stem 4 and the inner inlet portion Eu is open in an annular shape between an inner side face of the head portion 4h of the stem 4 and the tip end portion of the shaft portion 62. In a closed state, the head portion 4h becomes seated on the valve seat 31 to close the outer inlet portion Es. At the same time, the head portion 4h comes in contact with (becomes seated on) the side face of the shaft portion 62 to close the inner inlet portion Eu. The outer side face of the head portion 4h is formed in a tapered shape conforming to the valve seat 31. The inner side face of the head portion 4h is formed in a tapered shape conforming to the side face of the tip end portion of the shaft portion 62.

The above-described tire cure mold is equivalent to a normal tire cure mold except that the vent plugs mounted in the vent holes are formed as described above. Therefore, any of prior-art known shapes, materials, mechanisms, and the like can be used for the present invention.

The present invention is not limited to the embodiment mentioned above, but can be improved and modified variously within the scope of the present invention.

What is claimed is:

1. A vent plug mounted in a vent hole open in a molding face of a tire cure mold, the vent plug comprising:
   a cylindrical housing having a vent path in itself;
   a stem that is inserted into the housing and serves as a valve element for opening and closing the vent path; and
   a coil-shaped spring that biases the stem toward a cavity so as to open the vent path,
   wherein the vent path includes an outer inlet portion open in an annular shape between a valve seat provided to the housing and a head portion of the stem that comes in contact with the valve seat, and an inner inlet portion open in an annular shape on an inner side of the outer inlet portion.

2. The vent plug according to claim 1, wherein
   the stem includes a cylindrical outer stem member and an inner stem member inserted into the outer stem member,
   the outer stem member has a head portion that comes in contact with the valve seat to thereby close the outer inlet portion, and
   the inner stem member has a head portion that comes in contact with an inner side face of the head portion of the outer stem member to thereby close the inner inlet portion.

3. The vent plug according to claim 2, wherein the spring includes an outer spring that biases the outer stem member toward the cavity so as to open the outer inlet portion, and an inner spring that biases the inner stem member toward the cavity so as to open the inner inlet portion.

4. The vent plug according to claim 3, wherein a position of a farther end of the inner spring from the cavity is regulated by the outer stem member.

5. The vent plug according to claim 3, wherein a position of a farther end of the outer spring from the cavity is regulated by the housing.

6. The vent plug according to claim 3, wherein the outer spring has a different spring rate from the inner spring.

7. The vent plug according to claim 2, wherein
- an outer side face of the head portion of the outer stem member is formed in a tapered shape conforming to the valve seat, and
- a side face of the head portion of the inner stem member is formed in a tapered shape conforming to the inner side face of the head portion of the outer stem member.

8. A tire cure mold comprising the molding face that comes in contact with an outer surface of a tire set in the cavity and the vent plug according to claim 1 mounted in the vent hole open in the molding face.

9. A tire cure mold comprising the molding face that comes in contact with an outer surface of a tire set in the cavity and the vent plug according to claim 6 mounted in the vent hole open in the molding face,
- wherein the vent hole in which the vent plug is mounted is disposed at a position close to an outer edge of a recessed portion formed in the molding face to form a land and the outer spring has a higher spring rate than the inner spring.

10. A method of manufacturing a tire comprising a step of performing cure by setting an uncured tire in the cavity of a tire cure mold including the vent plug according to claim 1 and heating and pressurizing the uncured tire.

\* \* \* \* \*